United States Patent
Agrawal et al.

(10) Patent No.: US 11,416,079 B2
(45) Date of Patent: Aug. 16, 2022

(54) SNAP MOTION GESTURE DETECTION AND RESPONSE

(71) Applicant: MOTOROLA MOBILITY LLC, Chicago, IL (US)

(72) Inventors: Amit Kumar Agrawal, Bangalore (IN); Xin Zhao, Nanjing (CN); Yonghua Hu, Nanjing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/111,254

(22) Filed: Dec. 3, 2020

(65) Prior Publication Data

US 2022/0179495 A1 Jun. 9, 2022

(51) Int. Cl.
*G06F 3/01* (2006.01)
*G06V 40/20* (2022.01)

(52) U.S. Cl.
CPC .............. *G06F 3/017* (2013.01); *G06V 40/28* (2022.01)

(58) Field of Classification Search
CPC ..... G06F 3/017; G06K 9/00355; G06V 40/28
See application file for complete search history.

(56) References Cited

U.S. PATENT DOCUMENTS

| | | | | |
|---|---|---|---|---|
| 9,864,433 B2 * | 1/2018 | Pinault | | G06F 3/017 |
| 2013/0033459 A1 * | 2/2013 | Guo | | G06F 3/04815 |
| | | | | 345/175 |
| 2013/0229358 A1 * | 9/2013 | Hamilton, II | | G06F 3/0485 |
| | | | | 345/173 |
| 2014/0217178 A1 * | 8/2014 | Zhou | | G06K 7/1417 |
| | | | | 235/454 |
| 2016/0109954 A1 * | 4/2016 | Harris | | H04L 67/12 |
| | | | | 345/156 |
| 2016/0124513 A1 * | 5/2016 | Dal Zot | | G06F 3/011 |
| | | | | 715/863 |
| 2016/0195856 A1 * | 7/2016 | Spero | | G06N 5/046 |
| | | | | 700/90 |
| 2017/0097687 A1 * | 4/2017 | Pinault | | G06F 3/017 |
| 2018/0067562 A1 * | 3/2018 | Saitou | | G06F 3/011 |
| 2018/0150147 A1 * | 5/2018 | Fujimaki | | G06F 3/017 |
| 2019/0362557 A1 * | 11/2019 | Lacey | | G06F 3/012 |

* cited by examiner

*Primary Examiner* — Grant Sitta
(74) *Attorney, Agent, or Firm* — Isidore PLLC

(57) ABSTRACT

A method including capturing a series of image frames of a hand. The method includes generating a map of hand landmarks for each in the series of image frames. The method includes determining whether the maps of hand landmarks include at least: (i) a first map that matches a first reference map of hand landmarks representing a hand in substantially a start position of a snap motion and (ii) a subsequent, second map that matches a second reference map of hand landmarks representing a hand in a progressed (e.g., intermediate or end) position of a snap motion. The method includes determining that a finger-snap gesture is detected in response to determining that the first map and second map were generated from image frames captured within a snap time limit; and executing an action corresponding to a determination that a finger-snap gesture is detected in the series of image frames.

18 Claims, 7 Drawing Sheets

SNAP MOTION GESTURE DETECTION AND RESPONSE

BACKGROUND

1. Technical Field

The present disclosure generally relates to mobile devices having an image capturing device, and more particularly to mobile devices that performs finger-snap motion gesture detection via an image capturing device.

2. Description of the Related Art

Increasingly, mobile communication devices, such as smartphones, are designed to support connection to an external device, such as a laptop computer or electronic display device. A smartphone includes a data port that enables connection to a docking station that is in turn connected to a separate display monitor, such as a computer monitor or a television. In some implementations, the smartphone can be directly connected to the separate display monitor. While connected to the external monitor, the smartphone enables a user to play device-supported games or to watch television shows, movies, and videos playing on the smartphone, but presented on the external display in immersive ultra-high definition and clarity. Also, while connected to the docking station, the front and rear cameras of the smartphone are unobstructed, which enables either camera to be stably positioned for video calls. The user can benefit from having more flexibility to control operations of the smartphone.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
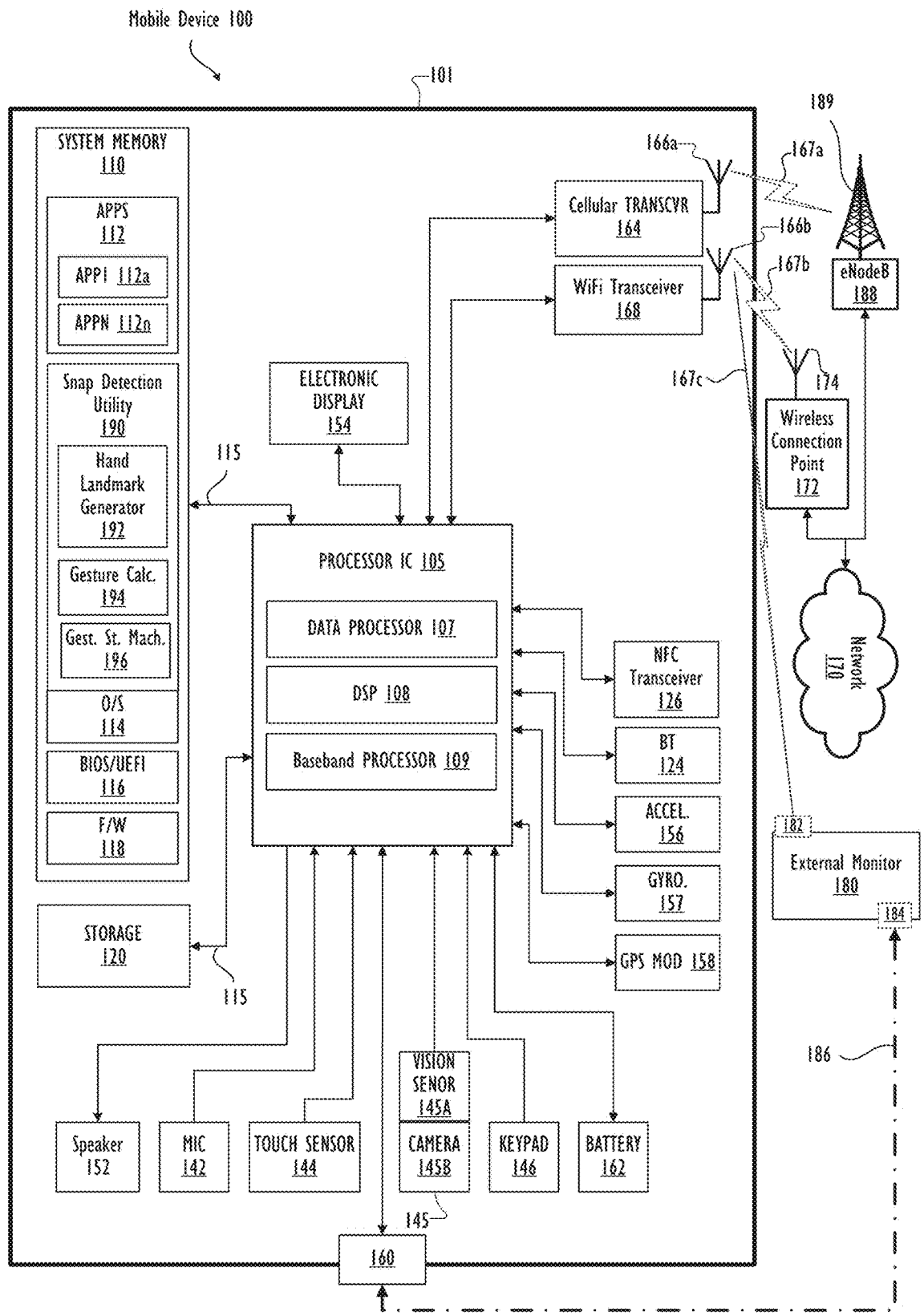
FIG. 1 is a block diagram representation of an example mobile device within which certain aspects of the disclosure can be practiced, in accordance with one or more embodiments of this disclosure.

The illustrative embodiments describe a method, a mobile device, and a computer program product that supports and/or provides finger-snap gesture detection and execution of an action based on the detection. According to one aspect, a mobile device includes an image capturing device, a memory, and a processor coupled to the image capturing device and the memory. The image capturing device captures a series of image frames of a scene that includes a hand. The memory stores a snap detection utility (SDU) providing a hand landmark generator, a gesture calculator, and a gesture state machine. The processor executes program code of the SDU that enables the device to generate, using the hand landmark generator, a map of hand landmarks for each of at least two image frames in the series of image frames. The processor execution of the program code enables the device to determine, using the gesture calculator, whether the maps of hand landmarks include at least: (i) a first map that matches a first reference map of hand landmarks representing a hand in substantially a start position of a snap motion; and (ii) a subsequent, second map that matches a second reference map of hand landmarks representing a hand in substantially a progressed position of a snap motion. The processor execution of the program code enables the device to determine, by analyzing the maps generated from at least two frames among the series of image frames, that a finger snap gesture is detected in the series of image frames. The processor executes program code that enables the device to execute an action corresponding to the finger snap gesture detected in the series of image frames.

In at least one embodiment, the processor determining that the finger snap gesture is detected includes the processor executing SDU program code that enables the device to determine, using the gesture state machine, whether the first map and second map were generated from image frames captured within a snap time limit. And, in response to determining that the first map and second map were generated from image frames captured within the snap time limit, the processor determines that the finger-snap gesture is detected in the series of image frames.

According to another aspect of the disclosure, a method is provided within a mobile device. The method includes capturing, using an image capturing device, a series of image frames of a scene that includes a hand. The method includes generating a map of hand landmarks for each of at least two image frames in the series of image frames. The method includes determining whether the maps of hand landmarks include at least: (i) a first map that matches a first reference map of hand landmarks representing a hand in substantially a start position of a snap motion; and (ii) a subsequent, second map that matches a second reference map of hand landmarks representing a hand in substantially a progressed position of a snap motion. The method includes determining, by analyzing the maps generated from at least two frames among the series of image frames, that a finger snap gesture is detected in the series of image frames. The method includes executing an action corresponding to the finger snap gesture that is detected in the series of image frames.

According to one additional aspect of the disclosure, a computer program product is provided that includes a non-transitory computer readable storage device and program code on the computer readable storage device that when executed by a processor associated with a mobile device, the program code enables the mobile device to provide specific functionality according to the present disclosure. The processor execution of the computer program product code enables the mobile device to capture a series of image frames of a scene that includes a hand. The processor execution of the computer program product code enables the mobile device to generate a map of hand landmarks for each of at least two image frames in the series of image frames. The processor execution of the computer program product code enables the mobile device to determine whether the maps of hand landmarks include at least: (i) a first map that matches a first reference map of hand landmarks representing a hand in substantially a start position of a snap motion; and (ii) a subsequent, second map that matches a second reference map of hand landmarks representing a hand in substantially a progressed position of a snap motion. The processor execution of the computer program product code enables the mobile device to determine, by analyzing the maps generated from at least two frames among the series of image frames, that a finger snap gesture is detected in the series of image frames. The processor execution of the computer program product code enables the mobile device to execute an action corresponding to the finger snap gesture that is detected in the series of image frames.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 3B:
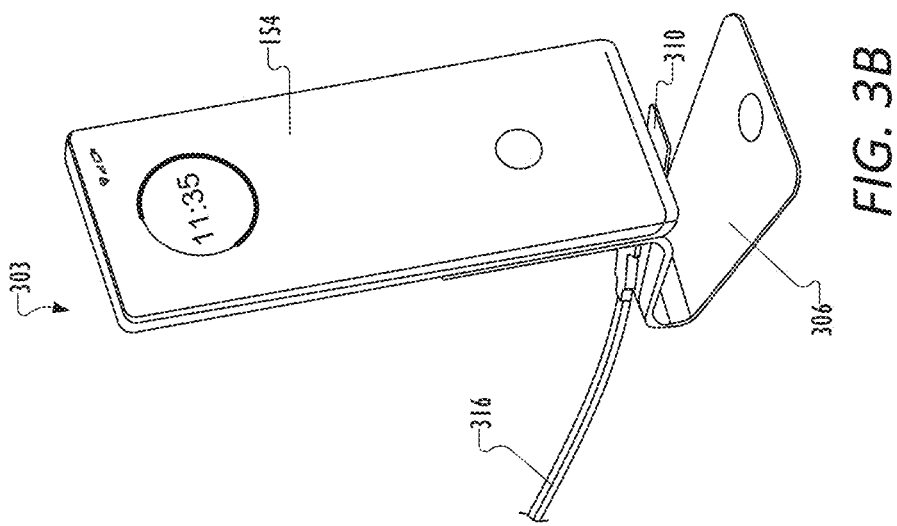
FIGS. 3A-3D (FIG. 3) illustrates portrait and landscape orientations of a mobile device that is docked in a docking station, in accordance with one or more embodiments of this disclosure.
Figure 3A:
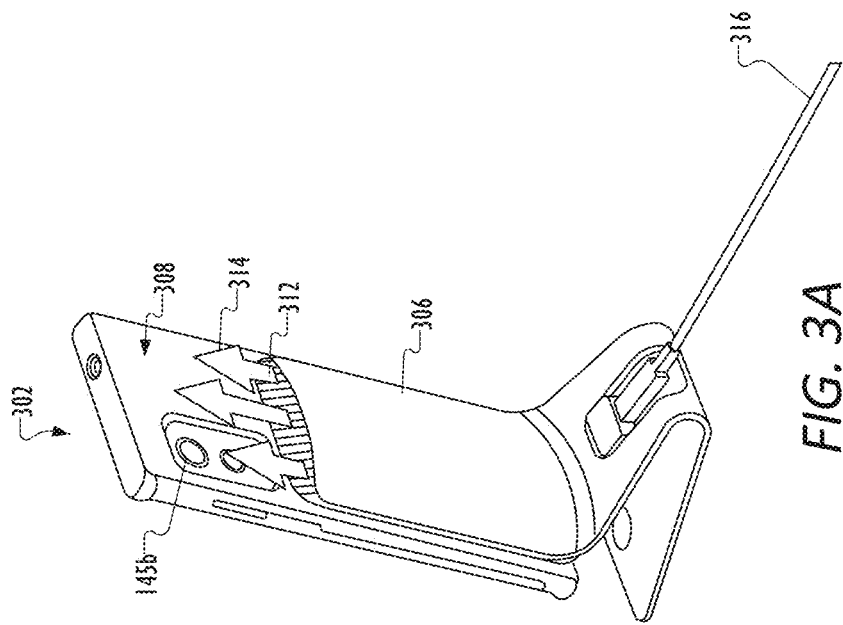
Figure 3C:
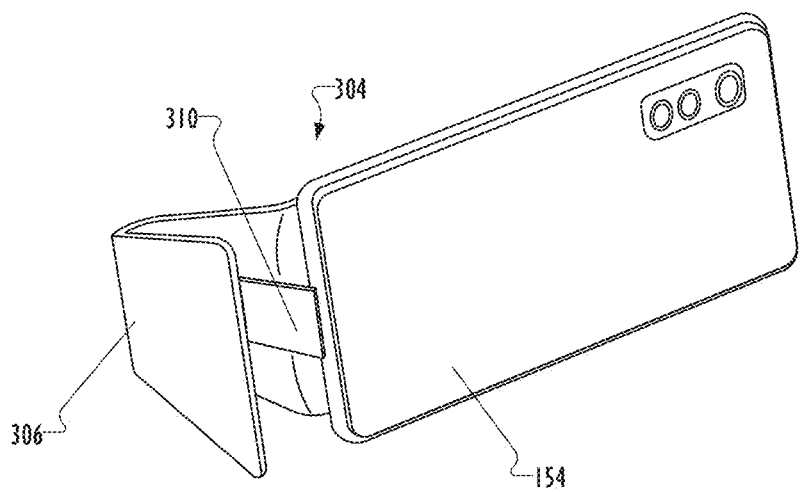

FIG. 1 is a block diagram representation of an example mobile device 100, within which one or more of the described features of the various embodiments of the disclosure can be implemented. Mobile device 100 of FIG. 1 is depicted as a two-dimensional block diagram. However, it is understood that mobile device 100 is physically configured as a three-dimensional device, as illustrated in FIGS. 3A-3C (FIG. 3). The description of certain physical attributes of mobile device 100 will be described with reference to those components within FIG. 3. As shown by FIG. 1, mobile device 100 includes functional compute components encased in an external casing, namely, housing 101. Mobile device 100 may be a smartphone, tablet, personal data assistant (PDA), a data processing system (DPS), a handheld device, personal computer, or any other suitable electronic device, and may vary in size, shape, performance, functionality, and price.

Mobile device 100 includes at least one processor integrated circuit, processor IC 105. Included within processor IC 105 are data processor 107 and digital signal processor (DSP) 108. In some embodiments, processor IC 105 includes a baseband processor 109. In some embodiments, baseband processor 109 is an additional integrated circuit processor that is not included within processor IC 105. Processor IC 105 is coupled to system memory 110 and non-volatile storage 120 via system interconnect 115. System interconnect 115 can be interchangeably referred to as a system bus, in one or more embodiments.

System memory 110 may be a combination of volatile and non-volatile memory, such as random access memory (RAM) and read-only memory (ROM). One or more software and/or firmware modules can be loaded into system memory 110 during operation of mobile device 100. As shown, system memory 110 can include therein a plurality of software and/or firmware modules including application(s) 112, operating system (O/S) 114, basic input/output system/unified extensible firmware interface (BIOS/UEFI) 116, other firmware (F/W) 118, and Snap Detection Utility (SDU) 190. The various software and/or firmware modules have varying functionality when their corresponding program code is executed by processor IC 105 or other processing devices within mobile device 100. Application(s) 112 includes a number (N) of mobile applications that perform data operations, including a first mobile application 112a (illustrated as "APP1") through an $N^{th}$ mobile application 112n (illustrated as "APPN"). Examples of a data operation include video streaming, audio streaming, downloading and uploading files, and presenting a game interface.

In some embodiments, storage 120 can be a hard drive or a solid-state drive. The one or more software and/or firmware modules within storage 120 can be loaded into system memory 110 during operation of mobile device 100.

Processor IC 105 supports connection by and processing of signals from one or more connected input devices such as audio capturing device 142, touch sensor 144, image capturing device 145, keypad 146, and other sensors. Audio capturing device 142 includes one or more microphones, and for simplicity, is also referred to as microphone 142. Microphone(s) 142 detects sounds, including a snap-click sound of a person snapping her finger, and other sounds, in the form of sound waves. In at least one embodiment, touch sensor 144 is a component of electronic display 154, enabling mobile device 100 to receive user tactile/touch input. Together, electronic display 154 and touch sensor 144 form a touchscreen electronic display that allows a user to provide input into mobile device 100 by touching features displayed on a display screen. Image capturing device 145 can include vision sensor 145a and/or camera 145b. Vision sensor 145a provides greater privacy than a traditional camera, as vision sensor 145a captures only outlines of objects, such as an outline of a hand, or an outline of a finger. In at least one embodiment, vision sensor 145a captures an outline of a hand, which activates vision sensor 145a and/or SDU 190 into a finger-snap gesture motion detection state. Camera(s) 145b captures still data and/or video image data, such as a series of image frames of the hand of a user, or a video of the hand or the face of the user(s).

Processor IC 105 also supports connection by and processing of signals to one or more connected output devices, such as speaker 152 and electronic display 154. In at least one embodiment, mobile device 100 includes multiple electronic displays 154. Electronic display 154 can be one of a wide variety of display devices, such as a liquid crystal display (LCD) or an organic light emitting diode (OLED) display.

Figure 3D:
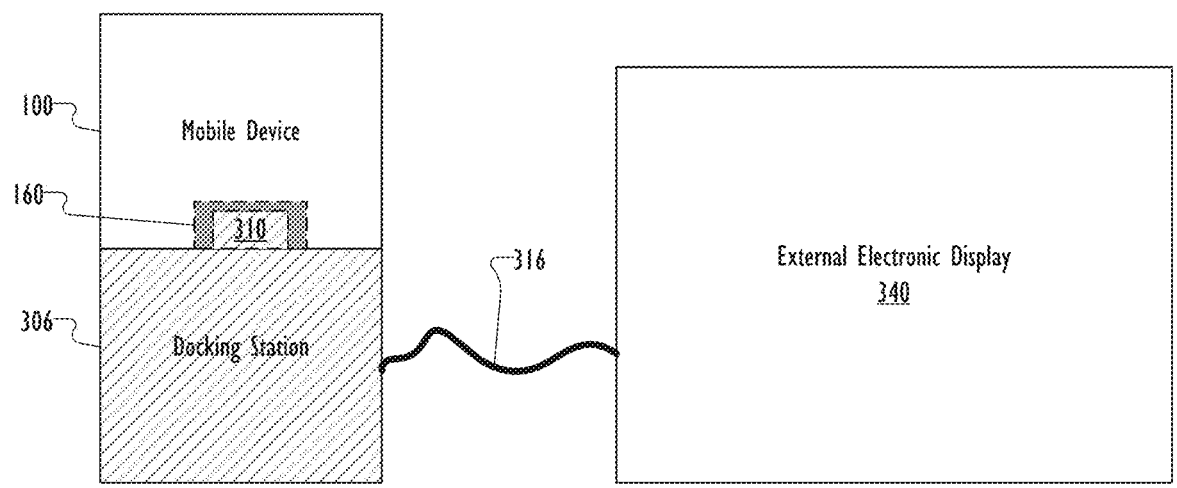

Additionally, in one or more embodiments, one or more device interface(s) 160, such as an optical reader, a universal serial bus (USB), a card reader, Personal Computer Memory Card International Association (PCMIA) slot, and/or a high-definition multimedia interface (HDMI), can be associated with mobile device 100. Mobile device 100 also contains a power source, such as battery 162, that supplies power to mobile device 100. At least one of the device interface(s) 160 enables mobile device 100 to connect to an external electronic display 180, such as a television or computer monitor. For example, at least one of the device interface(s) 160 connects to a cable 186, which also connects to a device interface 184 of the external electronic display 180. In one or more embodiments, as illustrated by FIGS. 3A-3D, at least one of the device interface(s) 160 enables mobile device 100 to connect to a docking station 306. As an example, in FIGS. 3A and 3B, device interface(s) 160 connects to docking station 306 using a connector 310 (e.g., USB-C connector or device-supported connector). It is appreciated that the type of connector can vary depending on the configuration and specification of device interface(s) 160. As illustrated by FIG. 3D, docking station 306 is connected to and enables mobile device 100 to communicate with an external electronic display 340, such as a television or computer monitor.

Mobile device 100 further includes Bluetooth transceiver (BT) 124, accelerometer (ACCEL.) 156, global positioning system module (GPS MOD) 158, and gyroscope 157, all of which are communicatively coupled to processor IC 105. Bluetooth transceiver 124 enables mobile device 100 and/or components within mobile device 100 to communicate and/or interface with other devices, services, and components that are located external to mobile device 100. Accelerometer 156 is utilized to measure non-gravitational acceleration and enables processor IC 105 to determine velocity and other measurements associated with the quantified physical movement of a user. Gyroscope 157 communicates the angular position of mobile device 100 using gravity to help determine orientation. GPS MOD 158 enables mobile device 100 to communicate and/or interface with other devices, services, and components to send and/or receive geographic position information.

Mobile device 100 is presented as a wireless communication device. As a wireless device, mobile device 100 can communicate and/or interface with other devices, services, and components that are located external (remote) to mobile device 100, via a communication network. These devices, services, and components can interface with mobile device 100 via an external network, such as example network 170, using one or more communication protocols. That is, mobile device 100 can transmit data over network 170. Network 170 can be a local area network, wide area network, personal area network, signal communication network, and the like, and the connection to and/or between network 170 and mobile device 100 can be wired or wireless or a combination thereof. For simplicity and ease of illustration, network 170 is indicated as a single block instead of a multitude of collective components. However, it is appreciated that network 170 can comprise one or more direct connections to other devices as well as a more complex set of interconnections as can exist within a wide area network, such as the Internet.

Mobile device 100 includes at least one transceiver, including cellular transceiver (Cellular TRANSCVR) 164 and wireless fidelity (WiFi) transceiver 168. Each transceiver 164, 168 is communicatively coupled to processor IC 105 and to a respective one of antennas 166a, 166b. Antennas 166a and 166b are generally and collectively referred to as antenna 166. Cellular transceiver 164 allows for wide-area communication via a wireless signal 167a, between mobile device 100 and evolved node B (eNodeB) 188, which includes antenna 189. WiFi transceiver 168 allows for local wireless communication, via a respective wireless signal 167b, between mobile device 100 and wireless connection point 172, which includes antenna 174. More particularly, WiFi transceiver 168 provides short-range communications with a WiFi access point 172 (generally wireless connection point 172) that provides access to the Internet via network 170. In the illustrative embodiment, WiFi transceiver 168 also allows for local wireless communication, via a respective wireless signal 167c, between mobile device 100 and wireless-enabled external monitor 180, which includes wireless receiver 182. Wireless receiver 182 can be built into monitor 180 or communicatively attached to monitor 180 via a dongle or HDMI or other port. In some embodiments, mobile device 100 additionally includes a near field communication transceiver 126, and a wireless power transfer receiver (not shown).

Mobile device 100 is capable of wide-area or local wireless communication with other mobile wireless devices or with eNodeB 188 as a part of a wireless communication network. Mobile device 100 communicates with other mobile wireless devices by utilizing a wide-area communication path involving cellular transceiver 164, antenna 166, wireless signal 167, antenna 189, and eNodeB 188. Mobile device 100 is able to send/receive data or otherwise communicate with other local, external devices by utilizing a short-range communication path involving WiFi transceiver 168, antenna 166, wireless signal 167, antenna 174, and wireless connection point 172. In one embodiment, other devices within mobile device 100 utilize antenna 166 to send and/or receive signals in the form of radio waves. For example, GPS module 158 can be communicatively coupled to antenna 166 to send/receive location data.

As introduced above, mobile device 100 includes SDU 190, which enables processor IC 105 to perform the method 700 (FIG. 7) of finger-snap gesture detecting and executing an action based on a result of the detection. As one example, motion sensors (e.g., accelerometer 156 and/or gyroscope 157) can detect that mobile device 100 is positioned in a substantially stationary position. While mobile device 100 is stationary, processor IC 105 initiates or resumes execution of SDU 190 to commence a finger-snap gesture motion detection process in order to determine whether a finger-snap gesture is detected. In at least one embodiment, in response to detecting that mobile device 100 is not substantially stationary, processor IC 105 pauses execution of SDU 190, so as to not capture video/images in which motion of a hand is difficult to distinguish from a dynamic background. In at least one embodiment, regardless of whether mobile device 100 is substantially stationary or detects a dynamic background (i.e., motion of background), SDU 190 is enabled to commence and complete a finger-snap gesture motion detection process. In at least one embodiment, an event that prompts a user of mobile device 100 to input a selectable response is an occurrence that triggers SDU 190 to commence the finger-snap gesture motion detection process. For example, first mobile application 112a can be a telephone application that enables inbound and outbound voice calls. In response to receiving an incoming voice call, the telephone application (112a) prompts the user of mobile device 100 to input a selectable response, namely, a selection to accept the call, to decline the call, or to ignore the call. A conventional mobile device presents a graphical user interface (GUI) that includes an accept button and a decline button for accepting or declining the incoming call, respectively. The conventional mobile device may additionally include a volume button, which when pressed by the user, triggers the mobile device to ignore (e.g., mute a ringer or turn off a vibrator) the incoming call. The conventional mobile device requires the user to physically touch the device in order to input a selectable response. As a technical advantage, mobile device 100 enables the user to input a selectable response by snapping her fingers, which requires only a visible motion of one hand of the user, and does not require the user to touch the mobile device 100. As an example, SDU 190 enables settings of the telephone application (112a) to be configured such that the incoming voice call is: (i) accepted if the user inputs only one finger-snap motion gesture; (ii) declined if the user inputs a gesture comprising repeated (i.e., multiple) finger-snaps in proximate time sequence (proximity) to each other; and (iii) ignored if no (i.e., zero) finger-snap motion gesture is detected. Additional aspects of SDU 190, and sub-modules thereof, including hand landmark generator 192, gesture calculator 194, and gesture state machine 196, and functionality thereof, are presented within the description of FIGS. 2-7.

Figure 2:
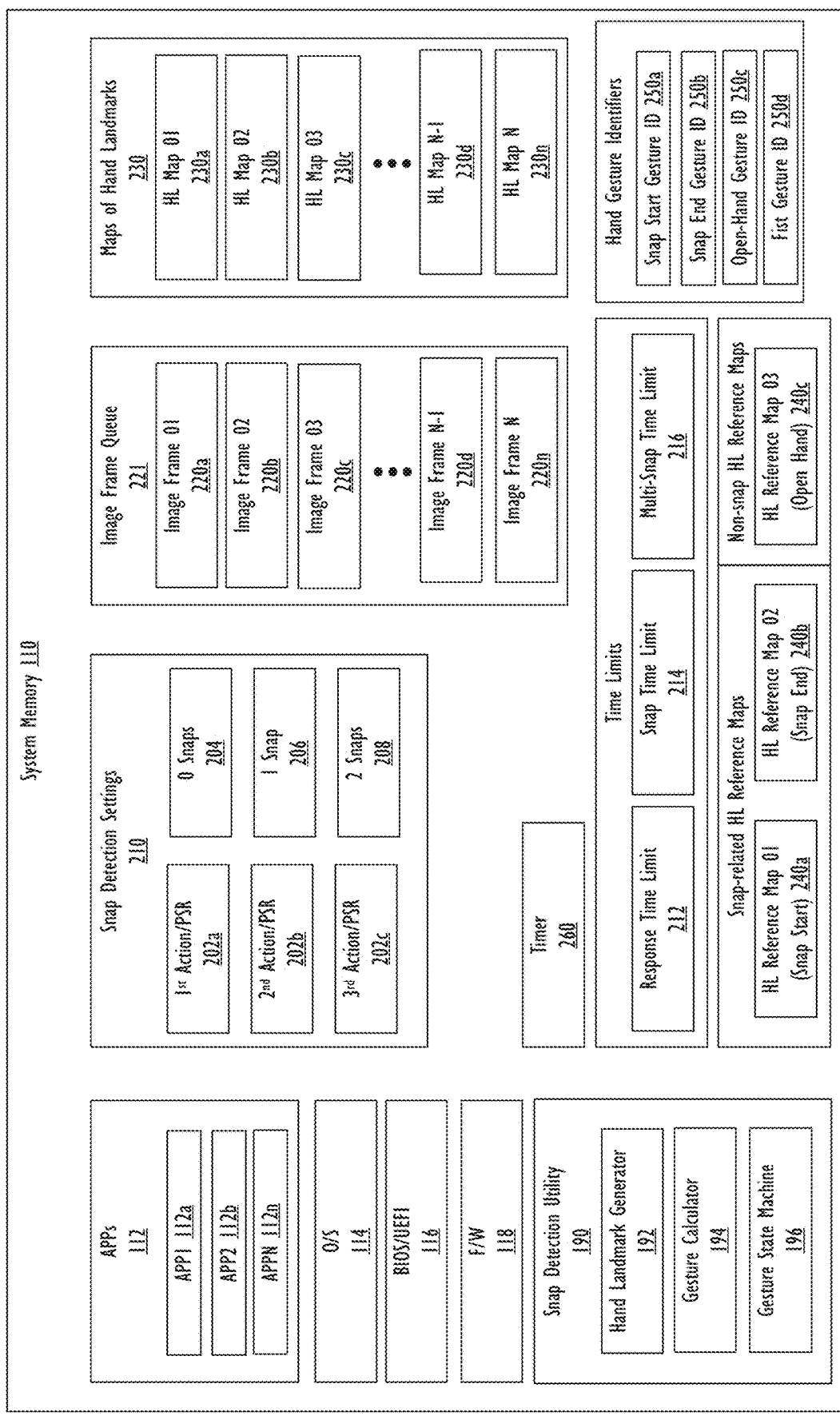
FIG. 2 is a block diagram presenting example contents of the system memory of the mobile device and which enables finger-snap gesture detection and response, according to one or more embodiments.

In the description of the following figures, reference is also occasionally made to specific components illustrated within the preceding figures, utilizing the same reference numbers from the earlier figures for the same components. With reference now to FIG. 2, there is illustrated a block diagram presenting example contents of the system memory 110 of mobile device 100 (FIG. 1) that enables finger-snap gesture detection, according to one or more embodiments. As described above, system memory 110 includes applications 112, O/S 114, BIOS/UEFI 116, F/W 118, and SDU 190. SDU 190 includes hand landmark generator 192, gesture calculator 194, and gesture state machine 196. In at least one embodiment, hand landmark generator 192 includes a hand landmark detection system. System memory 110 also includes the following components or modules: preconfigured selectable responses (PSR) 202a-202c and snap quantity identifiers 204, 206, 208 within snap detection settings 210; time limits, including response time lime 212 and snap time limit 214; image frames 220a-220n stored in image frame queue 221; maps 230 of hand landmarks (also referred to as "HL maps") including first HL map 230a through Nth HL map 230n generated based on corresponding image frames 220a-220n; a set of reference maps of hand landmarks (also referred to as "HL reference maps") including first HL reference map 240a through third HL reference map 240c; and multiple hand gesture identifiers 250a-250d. The set of HL reference maps 240a-c can be divided such that HL reference maps 240a-240b related to a snap gesture are separate from non-snap HL reference maps 240c not related to a snap gesture. Open-hand gesture ID 250c is not related to snap HL reference maps 240a-240b, but instead is related to a non-snap HL reference map 240c.

SDU 190 is enabled to implement a finger-snap detection process in response to a triggering event. Example triggering events can include: detecting mobile device 100 is positioned in a stationary position; detecting a connection of mobile device 100 to an external display device; or detecting a connection of mobile device 100 to a docking station 306 (FIG. 3). The triggering event indicates that mobile device 100 is substantially stationary. As described more particularly below, in some embodiments, in response to detecting a triggering event, SDU 190 prompts a user to input a selectable response (e.g., a selection to operate in a desktop mode or a selection to operate in a smartphone mode). In such embodiments, the triggering event is categorized as an event prompting a user of mobile device 100 to input a selectable response.

In response to detecting an event prompting a user to input a selectable response, SDU 190 commences the finger-snap detection process by activating (e.g., turning ON) image capturing device 145 and capturing, using image capturing device 145, a series of image frames. Examples of an event prompting a user to input a selectable response is a telephone application GUI prompting a user to input a selection to accept, decline, or ignore an incoming voice call via a telephone application (112a) and a video conferencing GUI prompting the user to receive an incoming video call via a video conferencing application (112). In the incoming voice call and video call examples, there are three preconfigured selectable responses (PSR): a first PSR 202a to accept the incoming call; a second PSR 202b to decline; and a third PSR 202c to ignore. The telephone application (112a) provides a response time limit 212, which is a limited time during which the user can input a selectable response. For example, response time limit 212 can represent the window of time from the moment the incoming call is initially detected and the moment the incoming call ends (e.g., is redirected to a voicemail system). If during the response time limit 212, mobile device 100 does not receive a user input that selects a selectable response, then SDU 190 ends the finger-snap detection process.

In certain embodiments, SDU 190 provides a snap time limit 214, which is a limited time during which the user is allowed to commence and complete a snap motion. For example, snap time limit 214 can represent the window of time starting at the moment the image capturing device 145 captures a photograph 402 (FIG. 4A) or a starting frame of a multi-frame image of a hand in the start snap position and ending at the moment a snap time limit timer 260 expires. Expiry of the snap time limit timer 260 indicates that snap time limit 214 (defining a specific period of time) has elapsed since capturing the photograph 402. Snap time limit 214 can be a length of time (measured in seconds or microseconds) that it takes an average human to snap her fingers and to hear the resulting snap-click sound. In at least one embodiment, snap time limit 214 represents a multi-snap time limit 216, which can be a length of time that it takes an average human to repeatedly snap her fingers (e.g., two times back-to-back) and to hear the resulting snap-click sounds. The window of time defined by snap time limit 214 is bounded within the window of time defined by response time limit 212, such that SDU 190 is able to start the snap time limit timer 260 only while the finger-snap detection process is ongoing. Snap time limit 214 can be (is likely) shorter than response time limit 212, enabling multiple snap motion gestures to be detected within the interval corresponding to response time limit 212.

SDU 190 is applicable in other use cases, in addition to the incoming call use case example. It is understood that this specification does not provide an exhaustive list of use cases for SDU 190. A second example is prompting a user to input a selection to operate mobile device 100 in a desktop mode or in a smartphone mode. This prompt is presented (for a limited period of time) in response to connecting (via a wire or wirelessly) mobile device 100 to an external display device. User selections can preconfigure mobile device 100 to operate in the desktop mode if a snap motion gesture is detected, and to alternatively operate in a smartphone mode if no snap motion gesture is detected. A third example that is implemented with a camera application (for example, a second mobile application 112b) is prompting a user to input a selection to immediately capture an image using still photography, to capture an image using still photography after a delay (e.g., 2 seconds or 10 seconds), to start/resume recording a video, or to stop/pause recording a video. In the case of a media playback application (for example, $N^{th}$ mobile application 112n), a fourth example is prompting a user to input a selection to playback pre-recorded media (e.g., audio, video, or audiovisual work) when a specific pre-recorded media has been selected. In the case of a media playback application (112n), a fifth example is prompting a user to input a selection to stop/pause playing back of the specific pre-recorded media. The camera application and media playback application may each provide a respective response time limit 212. In the case in which application 112 activates an alarm (e.g., clock, timer, or home security), a sixth example entails prompting a user to input a selection to acknowledge/stop the active alarm or a selection to snooze.

SDU 190, using an image capturing device 145, captures image frames 220a-220n of a scene in real time. Image frames 220a-220n can be raw photographs, modified photographs that were subjected to image processing, or video image frames. In the illustrative and described embodiments, the scene includes a hand (e.g., a real hand of a human). In one or more of these embodiments, vision sensor 145a dynamically/immediately activates camera 145b in response to detecting a hand (e.g., 404 of FIGS. 4A-4C) in the field of view of vision sensor 145a. Camera 145b captures image frames 220a-220n for a period of time defined by response time limit 212. The image frames 220a-220n are stored in image frame queue 221. In some embodiments, image frame queue 221 is a fixed size first-in-first-out (FIFO) queue into which SDU 190 loads image frames 220a-220n according to the time of capture by camera 145b. Image frame queue 221 and collectively, image frames 220a-220n, can be referred to as a series of image frames 220a-220n (or collectively 220). As referred to herein, in relation to image frames 220a-220n, the use of the terms first, second, etc. denotes order of capture of image frames 220a-220n and corresponding order of placement of image frames 220a-220n in image frame queue 221.

SDU 190 processes each of the image frames 220a-220n by implementing a snap motion gesture detection process 708 (FIG. 7), which subjects image frames 220a-220n to operations of hand landmark generator 192, gesture calculator 194, and gesture state machine 196. Details about operations performed by components 192, 194, 196 of SDU 190 are described more particularly below, such as in the description of FIGS. 4-6.

With reference now to FIGS. 3A-3C, there are illustrated two portrait orientations 302, 303 and landscape orientation 304 of mobile device 100 that is docked in a docking station 306, in accordance with one or more embodiments of this disclosure. More particularly, electronic display 154 is shown on the front surface of mobile device 100 in front portrait orientation 302. Rear camera 145b and the back surface 308 of mobile device 100 are shown in the reverse/back portrait orientation 303. Electronic display 154 is shown on the front surface of mobile device 100 positioned in landscape orientation 304.

Docking station 306 includes connector 310, such as an adjustable USB-C connector, that physically connects to device interface(s) 160 of mobile device 100. In at least one embodiment, docking station 306 includes an integrated cooling fan 312 that provides cooling air (illustrated as three upward arrows 314) to back surface 308 of mobile device 100. Integrated cooling fan 312 receives power through cable 316 that connects to docking station 306. One end of cable 316 terminates in and is communicatively coupled to connector 310. In at least one embodiment, cable 316 provides a communication connection between connector 310 of docking station 306 and a USB-C hub or an external electronic display 340 (FIG. 3D). That is, mobile device 100 communicates with USB-C hub or an external electronic display 340 through a communication path comprising device interface(s) 160, connector 310, and cable 316. It is understood that external monitor 180 of FIG. 1 and external electronic display 340 of FIG. 3D can be the same as or similar to each other.

Figure 4A:
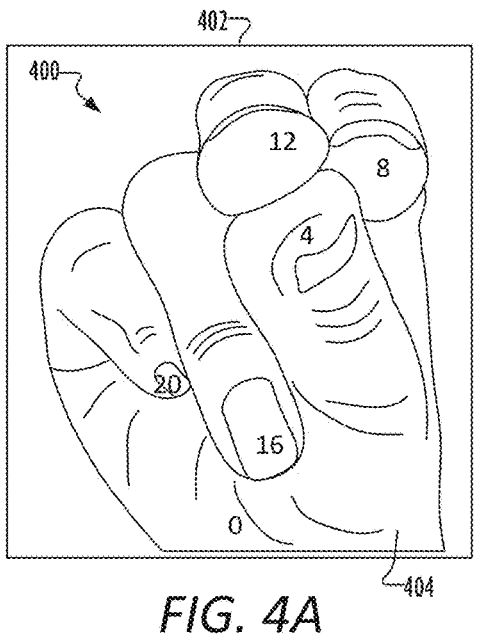
FIGS. 4A, 4B, and 4C illustrate examples of a map of hand landmarks that correspond to various hand gestures, with each example map corresponding to a respective hand gesture, in accordance with one or more embodiments of this disclosure.
Figure 4B:
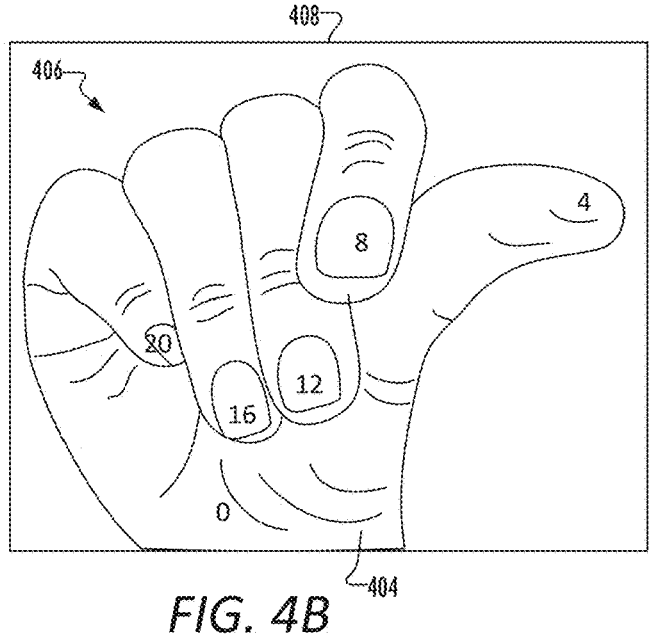
Figure 4C:
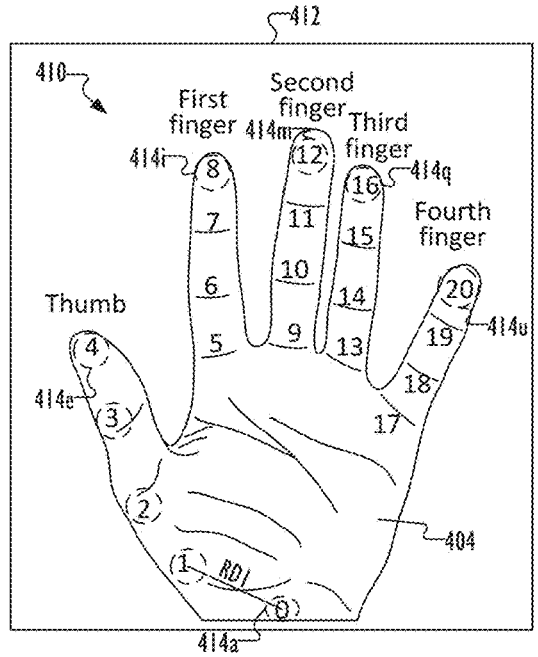

With reference now to FIGS. 4A, 4B, and 4C, there are illustrated three examples of a map of hand landmarks, each map corresponding to a different respective hand position, each hand position being associated with one or more hand gestures, in accordance with one or more embodiments of this disclosure. FIG. 4A shows first map 400 of hand landmarks ("first HL map") generated by hand landmark generator 192 based on first photograph 402, in which the captured scene includes a hand 404 in a start position of a snap motion. In this disclosure, the start position of a snap motion is also referred to as the "snap start" gesture, which is a hand gesture. FIG. 4B shows second map 406 of hand landmarks ("second HL map") generated by hand landmark generator 192 based on second photograph 408, in which the captured scene includes a hand 404 in an end position of a snap motion. In this disclosure, the end position of a snap motion is also referred to as the "snap end" gesture, which is a hand gesture. FIG. 4C shows third map 410 of hand landmarks ("third HL map") generated by hand landmark generator 192 based on a third photograph 412 in which the captured scene includes a hand 404 in an open-hand position, which is the "open-hand" gesture (i.e., hand gesture). Again, in general in this disclosure and specifically regarding first, second, and third HL maps 400, 406, and 410 and corresponding photographs 402, 408, and 412 shown in FIGS. 4A, 4B, and 4C, the use of the ordinal terms first, second, etc. do not denote any order or importance, but rather are used to distinguish one from another. However, as described more particularly below, it is understood that the order of hand gestures, which corresponds to the order of HL maps, is important to the detection of a snap motion gesture. A snap motion gesture requires a snap start gesture, which corresponds to first HL map 400, to occur in sequence before a snap end gesture, which correspond to second HL map 406.

Specifically referring to FIG. 4C, third map 410 of hand landmarks includes multiple hand landmarks 414a-414u (generally 414), which are illustrated as numbers zero through twenty (0-20). More particularly, hand landmark generator 192 receives third photograph 412 as input, generates twenty-one hand landmarks 414a-414u based on third photograph 412, and outputs third HL map 410. In system memory 110, SDU 190 stores a relationship indicating that third HL map 410 was generated from processing (e.g., based on) third photograph 412. In certain embodiments, hand landmark generator 192 generates a hand landmark 414 at each joint and each location where the hand can bend. The center of the wrist (i.e., bottom center of the hand) is associated with one hand landmark 414a (illustrated as "0"). The thumb is associated with four hand landmarks (illustrated as 1 through 4). The first, second, third, and fourth fingers are each associated with four hand landmarks, which are respectively illustrated as 5 through 8, 9 through 12, 13 through 16, and 17 through 20. The four hand landmarks per finger can represent three joints (i.e., metacarpophalangeal joint, proximal interphalangeal joint, and distal interphalangeal joint) and fingertip. The fingertip of the thumb and the first, second, third, and fourth fingers are respectively associated with hand landmarks 414e, 414i, 414m, 414q, and 414u.

Figure 4D:
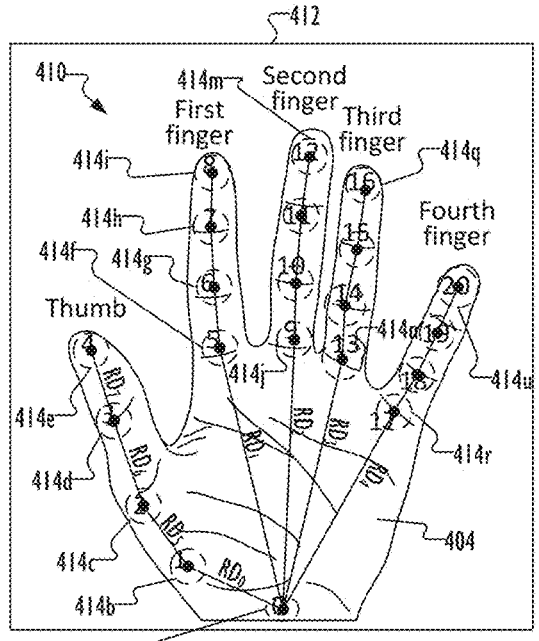
FIG. 4D illustrates the map of hand landmarks of FIG. 4C with multiple relative displacements between the hand landmarks, in accordance with one or more embodiments of this disclosure.

During training in which SDU 190 is trained to identify a hand 404 in the open position, third photograph 412 is used as input to hand landmark generator 192 because the photograph is known as showing hand 404 in the open-hand position. Hand landmark generator 192 receives third photograph 412 as input and generates third HL map 410 as output. The multiple hand landmarks 414a-414u generated by hand landmark generator 192 are not the only components of third HL map 410. Hand landmark generator 192 additionally generates relative displacement (i.e., relative distance and angle) between various hand landmarks 414a-414u. For ease of illustration and avoidance of cluttering FIG. 4C, third HL map 410 includes multiple relative displacements $RD_0$-$RD_{19}$ as shown in FIG. 4D. SDU 190 saves third HL map 410 as third HL reference map 240c, which is a reference map of hand landmarks that represents a hand in the open-hand position. In at least one embodiment, system memory 110 includes a logical relationship between third HL reference map 240c of hand landmarks and open-hand gesture identifier 250c, which relationship enables third HL reference map 240c to correspond to identification of the open-hand position. Analogously, system memory 110 includes a logical relationship between first reference map 240a of hand landmarks and snap start gesture ID 250a, which relationship enables first HL reference map 240a to correspond to identification of the snap start position. Additionally, system memory 110 includes a logical relationship between second reference map 240b of hand landmarks and snap end gesture ID 250b, which relationship enables second HL reference map 240b to correspond to identification of the snap end position.

FIG. 4D illustrates third HL map 410, which includes multiple relative displacements $RD_0$-$RD_{19}$ between multiple hand landmarks 414a-414u. More particularly, third HL map 410 includes relative displacement $RD_0$ that represents the relative distance and angle between hand landmark 414a (illustrated as "0") located at the center of the wrist and hand landmark 414b located at the carpometacarpal joint of the thumb. Similarly, third HL map 410 includes relative displacements $RD_1$, $RD_2$, $RD_3$, $RD_4$ that respectively represent the relative distance and angle between hand landmark 414a (illustrated as "0") and each of the hand landmarks 414f, 414j, 414n, 414r located at the metacarpophalangeal joint of the first, second, third, and fourth fingers, respectively. Regarding the thumb of hand 404, third HL map 410 includes three relative displacements $RD_5$, $RD_6$, $RD_7$ that represent the relative distance and angle between the pair hand landmarks 414b and 414c, the pair of hand landmarks 414c and 414d, and the pair of hand landmarks 414d and 414e. Similarly, regarding each of the first, second, third, and fourth fingers, third HL map 410 includes three relative displacements that respectively represent the relative distance and angle between: (i) the pair of hand landmarks located at the metacarpophalangeal joint and the proximal interphalangeal joint (illustrated on the first finger as hand landmarks 414f and 414g); (ii) the pair of hand landmarks located at the proximal interphalangeal joint and the distal interphalangeal joint (illustrated on the first finger as hand landmarks 414g and 414h); and (iii) the pair of hand landmarks located at the distal interphalangeal joint and the fingertip (illustrated on the first finger as hand landmarks 414h and 414i). For simplicity, relative displacements $RD_0$-$RD_{19}$ are illustrated for third HL map 410 only, but it is understood that first and second HL maps 400 and 406 each include relative displacements that represent the relative distance and angle between the various hand landmarks 414 of each HL map.

Referring back to FIG. 4C, during further training in which SDU 190 is trained to identify a hand 404 in the open position, third HL map 410 is used as input to gesture calculator 194 because the HL map is known as a representation of hand 404 in the open-hand position and is identical to third HL reference map 240c which correspond to open-hand gesture identifier 250c. Gesture calculator 194 receives third HL map 410 as input, applies a gesture algorithm to calculate a gesture of third photograph 412, and outputs a determination of whether third HL map 410 matches one or more of the HL reference maps 240a-240c stored in system memory 110. In executing the gesture algorithm, gesture calculator 194 compares the received HL map (third HL map 410) to a selected map(s) from among the set of HL reference maps 240a-240c. Gesture calculator 194 evaluates similarities and differences between which hand landmarks are identified in the received HL map (410) and those hand landmarks included in the HL reference map (e.g., third HL reference map 240c). Among the hand landmarks that are similarly identified in both maps (410 and 240c), gesture calculator 194 further evaluates that extent to which the relative displacements $RD_0$-$RD_{19}$ of the received HL map (410) are similar or different compared to relative displacements $RD_0$-$RD_{19}$ of the HL reference map (240c). In some embodiments, such as in the embodiments illustrated in the drawings of this disclosure, a set of default hand landmarks are used as reference points, for example, hand landmarks 414a-414u shown in FIGS. 4C-4D are default hand landmarks. As a technical advantage, default hand landmarks enable SDU 190 to detect snap gestures from multiple users having different sized and different shaped hands. In other embodiments without default hand landmarks, SDU 190 generates a user-specific set of hand landmarks that are used as reference points, enabling SDU 190 to detect snap gestures from each registered user of mobile device 100 whose hand has been previously presented SDU 190 for training/generating the user-specific set of hand landmarks. In applying the gesture algorithm, gesture calculator 194 generates a likelihood value that quantifies how closely the received HL map (410) matches the HL reference map (240c).

In some embodiments, gesture calculator 194 overlays the received HL map (410) onto the HL reference map (240c) in order to calculate a comparative displacement (CD) from a specific hand landmark (414a) of the HL reference map (240c) to a similarly identified specific hand landmark (414a) of the received HL map (410). Each of the snap-related HL reference maps 240a-240b can include a subset of hand landmarks designated (e.g., flagged) as key points, and a remainder of hand landmarks without the key points designation. For example, temporarily referring to FIG. 4A, gesture calculator 194 generates a high likelihood value if all of the hand landmarks (labeled 0, 4, 8, 12, 16, and 20) 414a, 414e, 414i, 414m, 414q, 414u corresponding to first HL reference map 240a are in the correct positions in the received HL map (e.g., first HL map 400). The correct position can be a within a threshold range of CD from the position of the similarly identified specific HL of the underlying HL reference map 240a. Gesture calculator 194 generates a low likelihood value if only key points (i.e., hand landmarks labeled 4, 8, and 12) are detected in the correct positions in the received HL map (400), and ignores or does not weigh other points (non-key hand landmarks labeled 0, 16, and 20).

According to one aspect of the disclosure, a high likelihood value indicates the following: (i) that the received HL map (e.g., 410 or 400 or 406, respectively) was generated from a received image frame (e.g., photograph 412 or 402 or 408, respectively) that depicts a hand 404 in a first hand position; and (ii) that the matching HL reference map (e.g., 240c or 240a or 240b, respectively) was generated from a training image that depicts a hand in an ideal hand gesture position (e.g., open-hand, start position, end position); and (iii) the first hand position is proximate to or at the ideal hand gesture position. In this training example, gesture calculator 194 determines that received HL map (410) matches the HL reference map (240c) based on a high likelihood value (e.g., greater than 70% likely, or ≥85% likely). In response to the determination that received HL map (410) matches HL reference map (240c), SDU 190 identifies that the matching HL reference map (240c) is related to open-hand gesture identifier 250c and determines that an open-hand gesture is detected in third photograph 412 (from which the received HL map (410) was generated) based on the identification. A training application 112 can be executed such that speaker 152 executes an action of announcing the phrase "open-hand" based on the determination that SDU 190 detected (e.g., recognized) an open-hand gesture in third photograph 412.

After SDU 190 is sufficiently trained to identify the open-hand gesture, mobile device 100 will be able to execute an action (e.g., announce "open-hand" via speaker 152) corresponding to a determination that SDU 190 detected an open-hand gesture in a later captured image frame 220. For simplicity, it is understood that the above described technique for training SDU 190 to identify an open-hand gesture can be analogously used to trained for identifying a start snap hand gesture (FIG. 4A or photograph 402' of FIG. 6), the snap end hand gesture (FIG. 4B or photograph 408' of FIG. 6), a first hand gesture (not shown), or another hand gesture. It is understood that a snap motion gesture can include hand gestures representing a hand in a progressed position, which is a position of a hand either in the end snap position or in an intermediate snap position between the start and end positions. The first hand gesture can be an example of a progressed, intermediate snap position.

SDU 190 is not limited to being trained to identify one or more hand gestures, in which a hand 404 is positioned in a particular way. According to embodiments of this disclosure, SDU 190 is also trained to identify one or more motion gestures, such as a snap motion gesture. A motion gesture includes more than one hand gesture in a particular sequence. More particularly, a snap motion gesture includes start snap hand gesture (FIG. 4A) followed by snap end hand gesture (FIG. 4B). The snap end hand gesture is not required to be the next image frame and is not required to be the next gesture immediately after the snap start hand gesture. In a first embodiment, SDU 190 detects a snap motion gesture in response to a determination that image frame queue 221 includes a start snap hand gesture (FIG. 4A) followed by snap end hand gesture. In a second embodiment, SDU 190 detects a snap motion gesture in response to a first determination that image frame queue 221 includes a start snap hand gesture (FIG. 4A) followed by snap end hand gesture and another determination that the image frames were captured within a window of time defined by snap time limit 214.

With reference to FIG. 4B, in at least one embodiment, in response to detecting a snap-click sound contemporaneously with capturing image frames 408 that includes a snap end hand gesture (i.e., related to second HL map 408), gesture calculator 194 increments the likelihood value, thereby increasing the value based on weighing contributions from audio (i.e., detected snap-click sound). The incremented likelihood value is relatively greater than a likelihood value calculated without weighing contributions from audio (e.g., increase from 70% to 95%).

With reference to FIG. 4A, in a first embodiment, the determination of whether the HL map (e.g., 400) received by gesture state machine 196 matches one or more of the HL reference maps 240a-240c is actually a determination of whether the received HL map (e.g., 400) matches one selected HL reference map that is selected by gesture state machine 196 or is selected based on a current state (e.g., state 606, 608, 610 of FIG. 6) of gesture state machine 196. More particularly, referring to FIG. 6, in this first embodiment, gesture state machine 196 selects one from among the set of HL reference maps 240a-240c based on a current state of the gesture state machine 196 and gesture calculator 194. In idle state 606 or in snap detected state 610 (FIG. 6), gesture state machine 196 selects first HL reference map 240a because the reference map is known as a representation of hand 404 in the snap start position. In snap waiting state 608 (FIG. 6), gesture state machine 196 selects second HL reference map 240a because the reference map is known as a representation of hand 404 in the snap end position.

In a second embodiment, the determination of whether the HL map (e.g., 400) received by gesture state machine 196 matches one or more of the HL reference maps 240a-240c is actually a determination of whether the received HL map (e.g., 400) matches any from among a subset of selected HL reference maps 240a-240c selected by gesture state machine 196 The subset of selected HL reference maps 240a-240c selected by gesture state machine 196 can be selected based on a current state (e.g., state 606, 608, 610 of FIG. 6) of gesture state machine 196. In idle state 606 or in snap detected state 608 (FIG. 6), gesture state machine 196 selects a subset of HL reference maps 240a and 240c that excludes second HL reference map 240b because the reference map (240b) is known as a representation of hand 404 in the snap end position. In snap waiting state 608 (FIG. 6), gesture state machine 196 selects a subset of HL reference maps 240b and 240c that excludes first HL reference map 240a because the reference map (240a) is known as a representation of hand 404 in the snap start position.

In the above described first and second scenarios, gesture state machine 196 provides technical advantages, such as conserving computing resources. The current state of gesture state machine 196 is the snap waiting state 608 after the snap detection process has commenced and before expiry of the response time limit 212. In snap waiting state 608, SDU 190 is waiting for gesture calculator 194 to detect a hand in the snap end position. In snap waiting state 608, SDU 190 avoids wasting (e.g., conserves) computing resources by discontinuing a search for an image frame 220 that includes a hand in the snap start position. Analogously, the current state of gesture state machine 196 is the snap detected state 610 after the snap detection process has commenced and before expiry of the response time limit 212. So, SDU 190 is waiting for gesture calculator 194 to detect a hand that is in the snap start position. In snap detected state 610, SDU 190 conserves computing resources by discontinuing a search for an image frame 220 that includes a hand in the snap end position.

The current state of gesture state machine 196 is the idle state 606 during either of the following two scenarios. Scenario 1 occurs when a snap detection process has not commenced, such as after response time limit 212 expires (e.g., times out) indicating the end of a previous snap detection process. Scenario 2 occurs after the snap detection process has commenced and before the response time limit 212 expires, such as while awaiting detection of a subsequent gesture after an initial snap motion gesture has been detected. A more specific occurrence of Scenario 2 is after an initial detection of a snap start gesture, plus after the initial snap time limit 214 expired, and while awaiting detection of a subsequent snap start gesture.

Figure 5:
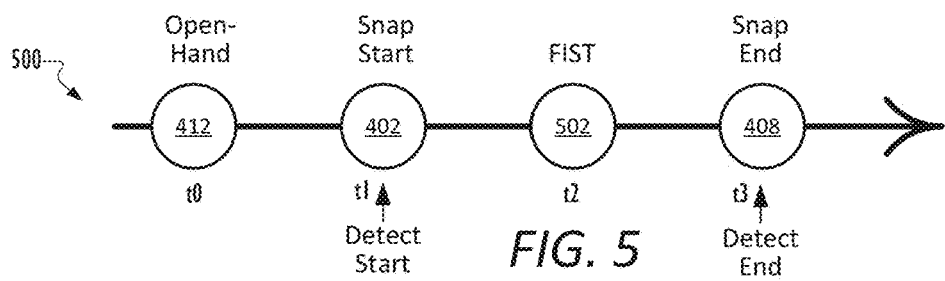
FIG. 5 illustrates an example series of images of hand gestures that will be processed by a Snap Detection Utility, in accordance with one or more embodiments of this disclosure.

With reference now to FIG. 5, there is illustrated an example timeline 500 of series of images of hand gestures that will be processed by SDU 190, in accordance with one or more embodiments of this disclosure. It is understood that during timeline 500, SDU 190 commences and completes a snap detection process throughout a response window of time defined by response time limit 212. SDU 190 captures a series of images at different times, t0-t3, including third photograph 412 captured at an initial time (t0), first photograph 402 subsequently captured at time t1, fourth photograph 502 captured later at time t2, followed by second photograph 408 captured at time t3. Fourth photograph 502 is abstractly illustrated as a circle, which is understood to represent a photograph of a hand in a first position. The response window (212) spans throughout and is longer than t0-t3. That is, SDU 190 has sufficient time to identify which hand gestures are associate with the series of captured photographs {412, 402, 502, 408}. The snap time limit spans throughout and at least as long as, or longer than t1-t3. That is, SDU 190 has sufficient time to detect a snap motion within a subset of photographs {402, 502, 408} captured at or after the time t1 of capturing a photograph 402 of a hand 404 in the start position of a snap motion.

Figure 6:
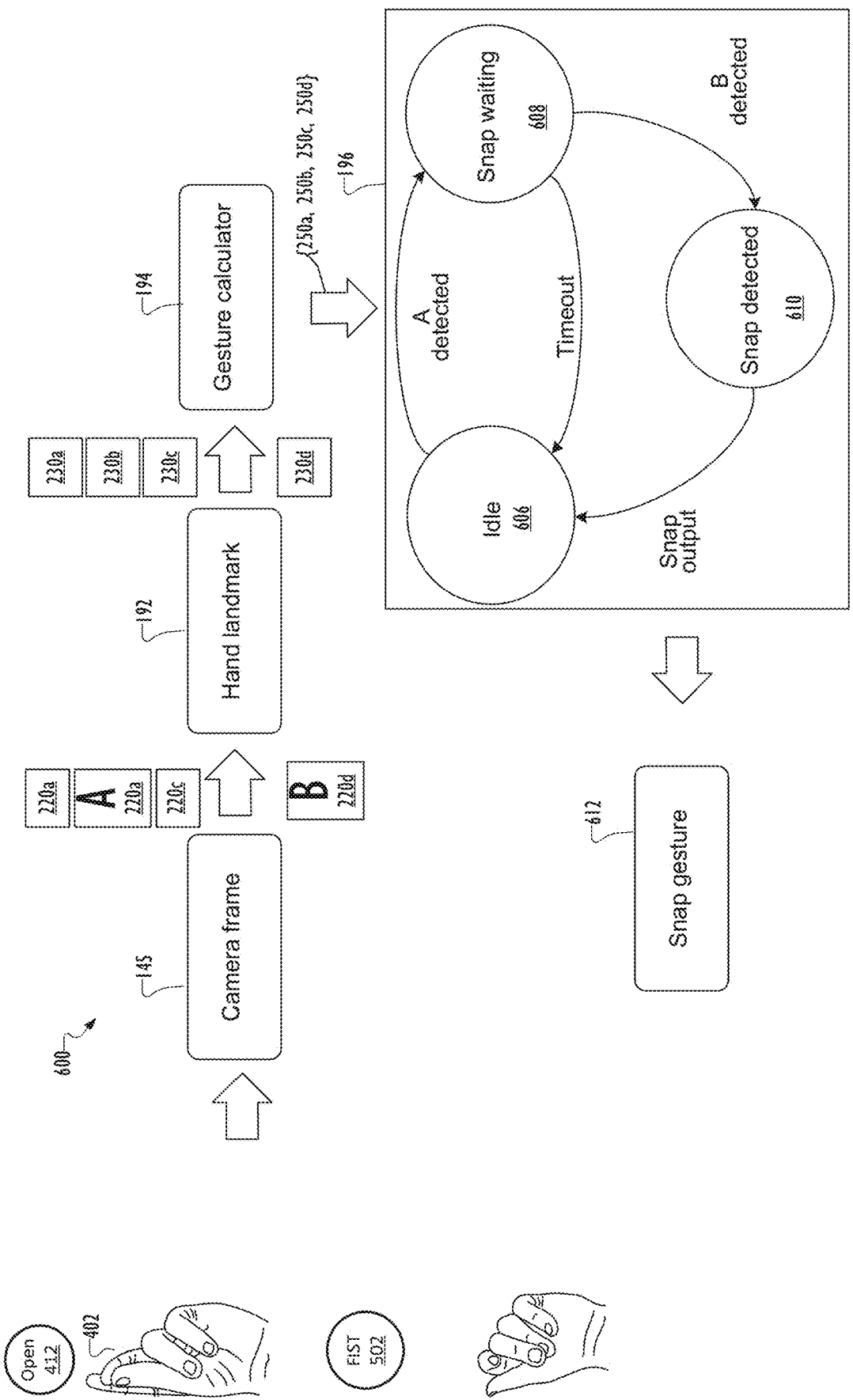
FIG. 6 illustrates a block diagram of example operations of a Snap Detection Utility, according to one or more embodiments.

With reference now to previously described FIG. 6, there is illustrated a block diagram of operations 600 of a SDU 190 along with state machine 196, according to one or more embodiments. The operations 600 include operations of triggering image capturing device 145 to capture a series of photographs as inputs, and operations of implementing a snap gesture detection process using hand landmark generator 192, gesture calculator 194, and gesture state machine 196. For ease of explanation, the operations 600 are described as a specific example in which the series of photographs {412, 402, 502, 408} of FIG. 5 are being processed by operations 600 of SDU 190 in FIG. 6.

Hand 604 is in a start position of a snap motion as captured in photograph 402' of FIG. 6, which for simplicity is the same as hand 404 in a start position of a snap motion as captured in photograph 402 of FIG. 4A. First HL map 400 generated based on photograph 402 of FIG. 4A can also be generated based on photograph 402' of FIG. 6. That is, SDU 190 is trained to identify multiple start positions of a snap motion, as both photographs 402 (FIG. 4A) and 402' (FIG. 6) show variations of a hand 404, 604 in the start position of a snap motion. It is understood that system memory 110 can include a logical relationship from snap start gesture ID 250a to multiple HL reference maps (in addition to first HL reference map 240a) that serve as a model for identifying a respective variation of the snap start position of a snap motion. The same is true for variations of the snap end position of a snap motion. Likewise, it is understood that the hand 604 in an end position of a snap motion as captured in photograph 408' of FIG. 6 can be the same as hand 404 in the end position of a snap motion as captured in photograph 408 of FIG. 4B. Second HL map 406 generated based on photograph 408 of FIG. 4B can also be generated based on photograph 408' of FIG. 6.

As described above, image capture device 145 captures a series of photographs {412, 402, 502, 408} during the timeline 500 (FIG. 5). In some embodiments, image capture device 145 is associated with an image processing unit (IPU), which SDU 190 uses to distinguish areas of the scene occupied by a hand 404 from areas of the scene occupied by the background. In some embodiments, SDU 190 uses the IPU of image capture device 145 to discard areas of the scene occupied by the background and store the remainder (i.e., areas of the scene occupied by hand 404, 604) of each photograph in image frame queue 221 as a corresponding series of image frames {220a, 220b, 220c, 220d}. That is, SDU 190 receives and stores the series of images {412, 402, 502, 408} in image frame queue 221 as first through fourth image frames {220a, 220b, 220c, 220d}.

SDU 190 uses hand landmark generator 192, gesture calculator 194, and gesture state machine 196 to process each image frame among the series of image frames {220a, 220b, 220c, 220d}. Hand landmark generator 192 receives the series of image frames {220a, 220b, 220c, 220d} as input and generates a corresponding series of HL maps {410, 400, 406 and an HL map (not shown) that is based on fourth image frame 502} based on the inputs. Hand landmark generator 192 stores the generated series HL maps in system memory 110 as first through fourth HL maps {230a, 230b, 230c, 230d}.

Gesture calculator 194 receives the series of HL maps {230a, 230b, 230c, 230d} as input, applies a gesture algorithm to the received input, and generates a corresponding series of hand gesture identifiers {Open-hand Gesture ID 250c, Snap Start Gesture ID 250a, first Gesture ID 250d, Snap End Gesture ID 250b} based on the input. As described above, in applying the gesture algorithm, gesture calculator 194 utilizes one or more states 606, 608, 610 of gesture state machine 196 to determine which hand gesture identifier 250 is associated with each of the received HL maps 230.

Gesture state machine 196 stores a current state, which represents a status of the finger-snap motion detection process at any given time. Gesture state machine 196 makes the current state accessible to gesture calculator 194 to affect the gesture algorithm. The current state of gesture state machine 196 can be an idle state 606, snap waiting state 608, or snap detected state 610. Reciprocally, gesture state machine 196 receives the series of hand gesture identifiers {250c, 250a, 250d, 250b} as input and determines when to switch states based at least in part on the received hand gesture identifiers 250. Gesture state machine 196 switches from idle state 606 to snap waiting state 608 in response to a determination that a start snap hand gesture was detected in the image frame queue 221. Receipt of Snap Start Gesture ID 250a as input indicates to gesture state machine 196 that SDU 190 has detected a start snap hand gesture in the second image frame 220b. In response to detecting the start snap hand gesture, SDU 190 starts a timer (260) for snap time limit 214. In some circumstances, response time limit 212 begins independent of the detection of a start snap hand gesture, such as at the start of an incoming phone call, in response to detecting connection to docking station 306 (FIG. 3), or in response to opening an application 112, (e.g., camera, media playback application). Gesture state machine 196 switches from snap waiting state 608 to idle state 606 if a snap end hand gesture is not detected in the image frame queue 221 before any of the following occur: expiration of response time limit 212, expiration (i.e., timeout) of snap time limit 214, or expiration of both time limits 212 and 214. Gesture state machine 196 switches from snap waiting state 608 snap detected state 610 in response to a determination that a snap end hand gesture was detected in the image frame queue 221. Receipt of Snap End Gesture ID 250b as input indicates to gesture state machine 196 that SDU 190 has detected a snap end hand gesture in the fourth image frame 220d. In the snap detected state 610, gesture state machine 196 outputs a snap output 612. In one embodiment, SDU 190 determines which snap quantity identifier 204, 220, 208 represents the detected snap motion gesture(s) at the end of the finger-snap motion detection process. SDU 190 accesses snap detection settings 210 (FIG. 2) to execute an action (i.e., PSR 202) that is pre-configured (e.g., manufacturer-selected default; or user-selected as being pre-selected by the user) as logically related to the selected one of snap quantity identifiers 204, 206, 208. SDU 190 provides snap detection settings 210 to respective ones of the applications 112, enabling the application to perform a different action (202) based on the quantity of snaps detected. In at least one embodiment, when no finger-snap gesture is detected, processor IC 105 performs an action that is associated with the application 112 when no finger-snap is detected (i.e., action associated with snap quantity identifier 204). If a single snap is detected, the processor IC 105 performs a second, different action that is pre-set within the application 112 (e.g., within snap detection settings 210) as the action to be performed in response to detection of a single snap (i.e., action associated with snap quantity identifier 206). Additionally, detection of multiple snaps occurring in succession (i.e., within a short period of time from each other) triggers processor IC 105 to perform a third action, which is pre-set as the action to be performed in response to detection of multiple successive snaps during execution of the application (i.e., action associated with snap quantity identifier 208). It is understood that, with the presented embodiment, each of the three actions (i.e., PSR 202a, 202b, 202c) are different from each other.

Figure 7:
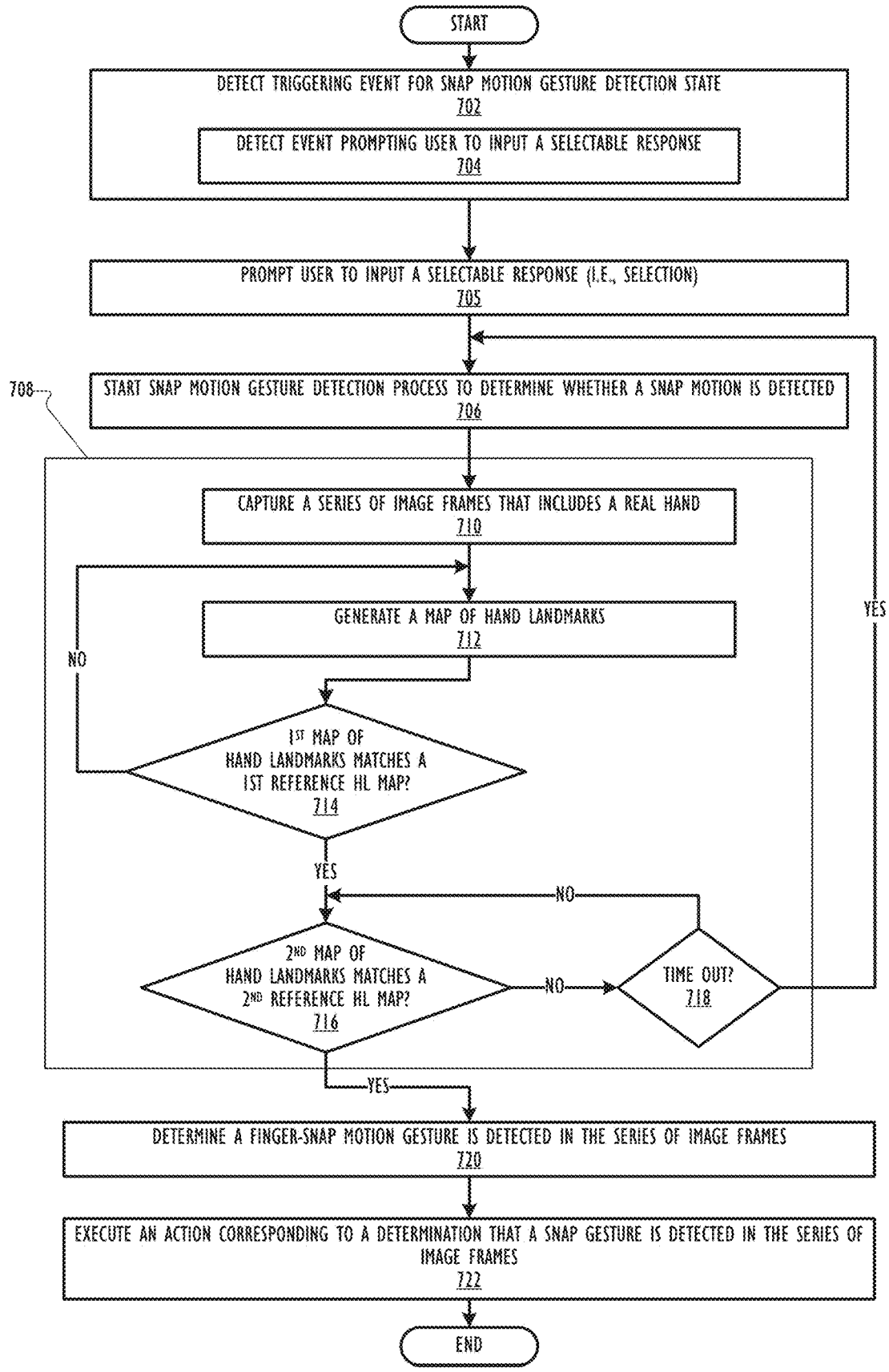
FIG. 7 is a flow chart illustrating a method for finger-snap gesture detection and executing an action based on the detection, in accordance with one or more embodiments of this disclosure.

With reference now to FIG. 7, there is illustrated a flow chart of a method 700 for finger-snap gesture detection and execution of an action based on a result of the detection, in accordance with one or more embodiments of this disclosure. The description of method 700 will be described with reference to the components and examples of FIGS. 1-6. The operations illustrated in FIG. 7 can be performed by mobile device 100 (FIG. 1) or any suitable device, including one or more functional components of mobile device 100 that provide the described features. One or more of the processes of the methods described in FIG. 7 are generally described as being performed by a processor (e.g., processor IC 105) executing program code associated with SDU 190, which execution involves the use of other components of mobile device 100.

Method 700 begins at start block and proceeds to block 702, at which processor IC 105 detects a triggering event that switches mobile device 100 into a snap motion gesture detection state (i.e., a state of actively attempting to detect a snap motion gesture). For example, the triggering event can be detecting that device interface 160 is connected to connector 310 of docking station 306. In at least one embodiment, detecting the triggering event comprises detecting (at block 704) an event prompting a user of mobile device 100 to input a selectable response (e.g., PSR 202). Examples of an event prompting the user of mobile device 100 to input a selectable response include: identifying that the mobile device is receiving an incoming call; identifying that the mobile device has an active alarm; identifying that the mobile device is connected to an external electronic display; identifying that the mobile device is docked in a docking station; identifying that the mobile device entered a video mode; and identifying that the mobile device entered a still frame picture mode. At block 705, in response to detecting the event prompting the user of mobile device 100 to input a selectable response, processor IC 105 prompts the user of mobile device 100 to input a selectable response (i.e., selection). At block 706, processor IC 105 commences a snap motion gesture detection process to determine whether a snap motion gesture is detected. More particularly, processor IC 105 activates image capturing device 145 (and where applicable, enables vision sensor 145a) to monitor for a scene that includes a hand. As shown in FIG. 7, method 700 includes a subprocess 708 that is referred to as the "snap motion gesture detection process" 708, which includes blocks 710-718.

At block 710, processor IC 105 captures a series of image frames. For example, processor IC 105 utilizes image capture device 145 to capture a series of photographs as inputs and stores the inputs in image frame queue 221 as a series of image frames 220a-220n. In some circumstances, at least one image frame from among the series of image frames includes a scene that includes a hand (e.g., 404 of FIG. 4A), such as a real hand of a human. At block 712, processor IC 105 generates a map of hand landmarks. In some embodiments, processor IC 105 generates a map of hand landmarks for each of at least two image frames in the received series of image frames. In other embodiments, processor IC 105 generates a map of hand landmarks based on each of the received series of image frames. At decision block 714, processor IC 105 determines whether a first map of hand landmarks (from among the maps of hand landmarks) matches a first HL reference map 240a. The first HL reference map 240a represents a hand in a start position of a snap motion, in a first embodiment. In an alternative, second embodiment, a snap motion gesture can be detected in response to the detection of a series of multiple intermediate progressed positions (herein referred to as "earlier progressed position" and "later progressed position"), without requiring the detection of the start snap position and/or the end position of the snap motion. When a person performs a snap motion, the person's hand is in the earlier progressed position after the person's hand was in the start position, and the person's hand is in the later progressed position after the person's hand was in the earlier progressed position. In this alterative, second embodiment, the first HL reference map 240a represents a hand in an earlier progressed position of a snap motion, and the second HL reference map 240b represents a hand in a later progressed position of a snap motion. In response to determining that no HL map (from among the maps of hand landmarks) matches the first HL reference map 240a, method 700 returns to block 712. In response to determining that a first map of hand landmarks matches the first HL reference map 240a, method 700 proceeds to block 716. At decision block 716, processor IC 105 determines whether a second map of hand landmarks (from among the maps of hand landmarks) matches a second HL reference map. The second HL reference map 240b represents a hand in a progressed position (i.e., intermediate position or end position) of a snap motion. In response to determining that no HL map (from among the maps of hand landmarks) matches the second HL reference map 240b, method 700 proceeds to block 718, at which processor IC 105 determines whether a time limit 212, 214 has timed out (expired). In response to determining that a second map of hand landmarks matches the second HL reference map 240b, snap motion gesture detection process 708 ends, and method 700 proceeds to block 720. Collectively, at decision blocks 714 and 716, processor IC 105 determines whether the maps of hand landmarks include at least: (i) a first map that matches first reference map 240a of hand landmarks representing a hand in a start position of a snap motion; and (ii) a subsequent, second map that matches a second reference map 240b of hand landmarks representing a hand in a progressed position of a snap motion.

In at least one embodiment of method 700, in order to make a determination that multiple finger-snap motion gestures are detected in the series of image frames, processor IC 105 iteratively repeats at least some of snap motion gesture detection process 708, such as repeating decision blocks 714 and 716. Again, collectively, at decision blocks 714 and 716, processor IC 105 determines whether the maps of hand landmarks include at least: (i) a third map that matches first reference map 240a of hand landmarks representing a hand in a start position of a snap motion; and (ii) a subsequent, fourth map that matches a second reference map 240b of hand landmarks representing a hand in a progressed position of a snap motion. The third map of hand landmarks corresponds to a later capture time than the second map and corresponds to an earlier capture time than the fourth map. In response to determining that no fourth HL map (from among the maps of hand landmarks) matches the second HL reference map 240b, method 700 proceeds to block 718, at which processor IC 105 determines whether a time limit (e.g., response time limit 212 or multi-snap time limit 216) has timed out.

In response to determining (at block 718) that a time limit 212, 214 has expired, method 700 returns to block 706 to start a new snap motion gesture detection process 708. Recalling the incoming call example, response time limit 212 may expire if the user does not provide user input while the incoming call is ringing. Also, in the incoming call example, if the user holds her hand in a start position of a snap motion (shown in FIG. 4A) while the incoming call is ringing, then the snap time limit timer 260 starts. If the user does not move her hand from the start position into a progressed position (e.g., end position shown in FIG. 4B) within a period of time defined by snap time limit 214, then snap time limit 214 (with snap time limit timer 260) expires. Snap time limit timer requires SDU 190 to detect (i.e., requires a user to complete performance of) a snap within a short window of time (214) commencing when the user initially holds her hand in the start position of a snap motion. In response to determining (at block 718) that a time limit 212, 214 has not expired, method 700 returns to decision block 716 to continue searching for a second map of hand landmarks that matches the second HL reference map 240b. At block 720, processor IC 105 determines that a finger-snap motion gesture is detected in the series of image frames. In at least one embodiment, processor IC 105 makes this determination in response to determining (or based on a determination) that the first HL map and the second HL map were generated from image frames captured within a snap time limit 214. In at least one embodiment, processor IC 105 makes this determination in response to determining (or based on a determination) that: (i) a first pairing of first HL map and the second HL map was generated from image frames captured within a snap time limit 214; a second pairing of third HL map and the fourth HL map was generated from image frames captured within a snap time limit 214; and the first and second pairings were generated within a multi-snap time limit 216. In at least one embodiment, in response to a combination of (i) detecting a snap-click sound contemporaneously with (ii) capturing image frames 408 that includes a specified set of fingers in particular specified locations (e.g., the snap end hand gesture of FIG. 4B), processor IC 105 determines that a finger-snap motion gesture is detected in the series of image frames based on the combination. In at least one embodiment, determining (at block 720) that a finger-snap motion gesture is detected in the series of image frames includes determining (at block 721) which snap quantity identifier 204, 220, 208 represents the detected finger-snap motion gesture(s) at the end of the finger-snap motion detection process.

At block 722, processor IC 105 executes an action based on a preconfigured selectable response (PSR). More particularly, the PSR corresponds to a determination of whether a finger-snap gesture is detected in the series of image frames. For example, snap detection settings 210 may indicate that a first PSR 202a corresponds to a situation in which processor IC 105 makes a determination that no finger-snap motion gestures is detected in the series of image frames (illustrated as "0 Snaps" snap quantity identifier 204). As another example, snap detection settings 210 may indicate that a second PSR 202b corresponds to a situation in which processor IC 105 makes a determination that one finger-snap motion gesture is detected in the series of image frames (illustrated as "1 Snap" snap quantity identifier 206). As another example, snap detection settings 210 may indicate that a third PSR 202c corresponds to a situation in which processor IC 105 makes a determination that multiple finger-snap motion gestures are detected in the series of image frames (illustrated as "2 Snaps" snap quantity identifier 208).

In the above-described flowchart of FIG. 7, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting a triggering event that switches a mobile device into a snap motion gesture detection state to commence a finger-snap gesture motion detection process;
   activating, based on detecting the triggering event, an image capturing device to capture a series of image frames of a scene;
   capturing, using the image capturing device, the series of image frames of the scene that includes a hand;
   generating a map of hand landmarks for each of at least two image frames in the series of image frames;
   determining whether the maps of hand landmarks include at least:
      a first map that matches a first reference map of hand landmarks representing a hand in substantially a start position of a snap motion; and
      a subsequent, second map that matches a second reference map of hand landmarks representing a hand in substantially a progressed position of a snap motion;
   determining, by analyzing the maps generated from at least two frames among the series of image frames, that a finger-snap gesture is detected in the series of image frames in response to determining that the first map and second map were generated from image frames captured within a snap time limit;
   executing a first action corresponding to a determination that the finger-snap gesture is detected in the series of image frames; and
   executing a second action corresponding to a next determination that the finger-snap gesture is not detected.

2. The method of claim 1, further comprising:
   determining that multiple finger-snap gestures are detected in the series of image frames based on a determination that the maps of hand landmarks includes a third map and a fourth map that respectively match the first reference map and the second reference map; and
   wherein executing an action comprises at least one of:
      executing a first action in response to the determination that multiple finger-snap gestures are detected in the series of image frames; and
      executing a second action in response to the determination that only one finger-snap gesture is detected in the series of image frames.

3. The method of claim 1, wherein the activating of the image capturing device into the snap gesture motion detection state comprises:
   activating the image capturing device in response to the event being a prompt for a user of the electronic device to input a selectable response.

4. The method of claim 1, wherein the event comprises at least one of:
   identifying that the electronic device is receiving an incoming call;
   identifying that the electronic device has an active alarm;
   identifying that the electronic device entered a video mode; or
   identifying that the electronic device entered a still frame picture mode.

5. The method of claim 1, further comprising:
   in response to detecting, using an audio capturing device, a snap-click sound contemporaneously with capturing image frames from which the second map is generated, incrementing a likelihood value indicating that a finger-snap gesture is detected in the series of image frames.

6. The method of claim 1, further comprising:
   detecting that a device interface of the electronic device is connected to a device-supported connector of a docking station; and
   in response to detecting the device interface is connected to the connector:
      activating the snap gesture motion detection state of the image capturing device and capturing the series of image frames of the scene and
      prompting a user of the electronic device to input a selection to operate in a desktop mode or a selection to operate in a smartphone mode.

7. The method of claim 1, wherein the event comprises at least one of:
   identifying that the electronic device is connected to an external electronic display; or
   identifying that the electronic device is docked in a docking station.

8. An electronic device comprising:
   an image capturing device that captures a series of image frames of a scene that includes a hand;
   a memory storing a snap detection utility providing a hand landmark generator, a gesture calculator, and a gesture state machine; and
   a processor coupled to the image capturing device and the memory, the processor executing program code that enables the electronic device to:
      detect a triggering event that switches the electronic device into a snap motion gesture detection state to commence a finger-snap gesture motion detection process;
      activate, based on detecting the event, the image capturing device to capture a series of image frames of a scene;
      generate a map of hand landmarks for each of at least two image frames in the series of image frames;
      determine whether the maps of hand landmarks include at least:
         a first map that matches a first reference map of hand landmarks representing a hand in substantially a start position of a snap motion; and
         a subsequent, second map that matches a second reference map of hand landmarks representing a hand in substantially a progressed position of a snap motion;
      determine, by analyzing the maps generated from at least two frames among the series of image frames, that a finger-snap gesture is detected in the series of image frames in response to determining that the first map and second map were generated from image frames captured within a snap time limit;
      in response to detecting, via an audio capturing device, a snap-click sound contemporaneously with capturing image frames from which the second map is generated, increment a likelihood value indicating that a finger-snap gesture is detected in the series of image frames; and
      execute an action corresponding to a determination that a finger-snap gesture is detected in the series of image frames.

9. The electronic device of claim 8, wherein the processor is further enabled to execute an action by at least one of:
   executing a first action in response to the determination that the finger-snap gesture is detected; and executing a second action in response to the determination that the finger-snap gesture is not detected.

10. The electronic device of claim 8, wherein the processor is further enabled to:

determine whether multiple finger-snap gestures are detected in the series of image frames based on a determination that the maps of hand landmarks include a third map and a fourth map that respectively match the first reference map and the second reference map.

11. The electronic device of claim 10, wherein the processor is further enabled to execute an action by at least one of:

executing a first action in response to the determination that multiple finger-snap gestures are detected in the series of image frames; and executing a second action in response to the determination that only one finger-snap gesture is detected in the series of image frames.

12. The electronic device of claim 8, wherein the program code further enables the electronic device to:

activate the snap gesture motion detection state of the image capturing device-in response to the event being a prompt for a user of the electronic device to input a selectable response.

13. The electronic device of claim 8, wherein the event comprises at least one of:

identifying that the electronic device is receiving an incoming call; or identifying that the electronic device has an active alarm.

14. The electronic device of claim 8, further comprising:

a device interface that connects to a device-supported connector of a docking station; and wherein the processor is further enabled to, in response to detecting a connection between the device interface and the connector:

activate the snap gesture motion detection state of the image capturing device and capture the series of image frames of the scene; and prompt a user of the electronic device to input a selection to operate in a desktop mode or a selection to operate in a smartphone mode.

15. The electronic device of claim 8, wherein the event comprises at least one of:

identifying that the electronic device is connected to an external electronic display; or identifying that the electronic device is docked in a docking station.

16. The electronic device of claim 8, wherein the event comprises at least one of:

identifying that the electronic device entered a video mode; or identifying that the electronic device entered a still frame picture mode.

17. A computer program product comprising:

a non-transitory computer readable storage device; and program code on the computer readable storage device that when executed by a processor associated with an electronic device, the program code enables the electronic device to provide the functionality of:

detecting a triggering event that switches the electronic device into a snap motion gesture detection state to commence a finger-snap gesture motion detection process;

activating, based on detecting the event, an image capturing device to capture a series of image frames of a scene;

capturing, using an image capturing device, a series of image frames of a scene that includes a hand;

generating a map of hand landmarks for each of at least two image frames in the series of image frames;

determining whether the maps of hand landmarks include at least:

a first map that matches a first reference map of hand landmarks representing a hand in substantially a start position of a snap motion; and a subsequent, second map that matches a second reference map of hand landmarks representing a hand in substantially a progressed position of a snap motion;

determining, by analyzing the maps generated from at least two frames among the series of image frames, that a finger-snap gesture is detected in the series of image frames in response to determining that the first map and second map were generated from image frames captured within a snap time limit;

executing a first action corresponding to a determination that a finger-snap gesture is detected in the series of image frames; and executing a second action corresponding to a next determination that the finger-snap gesture is not detected.

18. The computer program product of claim 17, wherein the program code comprises program code that, when executed by the processor, further enables the electronic device to provide the functionality of activating the snap gesture motion detection state of the image capturing device in response to the event being a prompt of a user of the electronic device to input a selectable response.

* * * * *